(12) United States Patent
Tung et al.

(10) Patent No.: US 7,687,124 B2
(45) Date of Patent: *Mar. 30, 2010

(54) OXYGEN-SCAVENGING CONTAINERS HAVING LOW HAZE

(75) Inventors: Deborah Tung, Tallmadge, OH (US); Edwin A. Sisson, Medina, OH (US); Roy A. Leckonby, Uniontown, OH (US)

(73) Assignee: M&G USA Corporation, Apple Grove, WV (US)

( * ) Notice: Subject to any disclaimer, the term of this patent is extended or adjusted under 35 U.S.C. 154(b) by 1445 days.

This patent is subject to a terminal disclaimer.

(21) Appl. No.: 10/195,385

(22) Filed: Jul. 16, 2002

(65) Prior Publication Data

US 2003/0040564 A1    Feb. 27, 2003

Related U.S. Application Data

(63) Continuation-in-part of application No. 09/916,671, filed on Jul. 26, 2001, now Pat. No. 6,780,916.

(51) Int. Cl.
*B65D 1/02* (2006.01)
*B65D 1/09* (2006.01)
*C08K 3/08* (2006.01)

(52) U.S. Cl. .................. 428/36.92; 428/35.8; 428/35.9; 523/200; 524/439; 524/440; 524/441

(58) Field of Classification Search ................ 428/35.8, 428/35.9, 36.92, 480; 523/200; 524/439, 524/440, 441
See application file for complete search history.

(56) References Cited

U.S. PATENT DOCUMENTS

| 4,250,078 A | | 2/1981 | McFarlane et al. |
| 4,476,272 A | | 10/1984 | Pengilly |
| 4,535,118 A | | 8/1985 | Pengilly |
| 4,595,715 A | | 6/1986 | Kuze et al. |
| 5,008,230 A | | 4/1991 | Nichols |
| 5,034,252 A | * | 7/1991 | Nilsson et al. ............. 428/35.8 |
| 5,153,038 A | | 10/1992 | Koyama et al. |
| 5,288,784 A | | 2/1994 | Minayoshi |
| 5,419,936 A | | 5/1995 | Tindale |
| 5,434,000 A | | 7/1995 | Konagaya et al. |
| 5,565,545 A | | 10/1996 | Kriesche et al. |
| 5,693,690 A | | 12/1997 | Hayashi et al. |
| 5,744,056 A | | 4/1998 | Venkateshwaran et al. |
| 5,759,653 A | * | 6/1998 | Collette et al. ............. 428/35.9 |
| 5,804,236 A | * | 9/1998 | Frisk .......................... 426/106 |
| 5,830,544 A | | 11/1998 | Kerscher et al. |
| 5,885,481 A | | 3/1999 | Venkateshwaran et al. |
| 5,902,373 A | | 5/1999 | Vännman et al. |
| 6,022,920 A | | 2/2000 | Maxwell et al. |
| 6,034,167 A | | 3/2000 | Tung et al. |
| 6,063,503 A | | 5/2000 | Hatakeyama et al. |
| 6,083,585 A | | 7/2000 | Cahill et al. |
| 6,113,997 A | | 9/2000 | Massey et al. |
| 6,143,815 A | | 11/2000 | Mizutani |
| 6,159,416 A | | 12/2000 | Kawakami et al. |
| 6,218,017 B1 | | 4/2001 | Yamashita et al. |
| 2002/0077405 A1 | | 6/2002 | Edwards et al. |

FOREIGN PATENT DOCUMENTS

| DE | 19832456 A | 1/2000 |
| EP | 0428736 A | 5/1991 |
| EP | 0921144 A | 6/1999 |
| WO | WO 93/05101 A | 3/1993 |

OTHER PUBLICATIONS

Aldrich Chemical Catalog, 1988, p. 395 (cobalt powder) and p. 887 (iron powder).*
Iron Powder in Aldrich Catalogue, 1988-1989, Aldrich Chemical Company, Inc. p. 887.*
Iron Powder in Janssen Chimica Catalogue, 1991-1992, Spectrum Chemical Mfg. Corp., p. 706.*

* cited by examiner

*Primary Examiner*—Tae H Yoon
(74) *Attorney, Agent, or Firm*—Edwin A. Sisson, Attorney at Law, LLC

(57) ABSTRACT

A container providing effective oxygen-scavenging functionality, while having low haze. The container has at least one wall, wherein the wall comprises a populated area, and wherein the populated area comprises a film-forming polymer; and a population of particles comprising an effective amount of oxygen-scavenging particles, wherein the number of particles of said population does not exceed a concentration of about $(6 \times 10^7 \text{ particles} \div T)$ per cubic centimeter of polymer wherein T is the thickness of the populated area in mils; and wherein the wall has a transmission Hunter haze of up to about 1 percent per mil of the container wall.

14 Claims, No Drawings

OXYGEN-SCAVENGING CONTAINERS HAVING LOW HAZE

CROSS-REFERENCE

This application is a continuation-in-part of application Ser. No. 09/916,671, filed on Jul. 26, 2001 now U.S. Pat. No. 6,780,916.

BACKGROUND OF THE INVENTION

Thermoplastic resins such as polyethylene terephthalate (PET) are commonly used to manufacture packaging materials. PET processed under the right conditions produces high strength articles with excellent gas barrier properties. Foods, beverages, and medicines can deteriorate or spoil if exposed to oxygen. To improve shelf life and flavor retention of products such as foods, beverages, and medicines, therefore, the barrier protection provided by PET is often supplemented with additional layers of packaging material or with the addition of oxygen scavengers.

Adding a layer of gas barrier film is known as passive-barrier packaging. Ethylvinyl alcohol (EVOH), Polyvinylidene dichloride (PVDC), and Nylon MXD6, are examples of films commonly used for this purpose due to their excellent oxygen barrier properties. Using distinct layers of differing materials is not preferred, however, because it adds cost to packaging construction and does not reduce the levels of oxygen already present in the package.

Adding oxygen scavengers to the PET resin is known as active-barrier packaging. This approach to protecting oxygen-sensitive products is two-fold; the packaging prevents oxygen from reaching the product from the outside, and also absorbs some of the oxygen present in the container and from within the polymer matrix. In some applications, small packets or sachets containing oxygen scavengers are added to the packaging container and lie next to the food. Sachets are generally limited to solid foods, where the sachet can be readily removed from the foodstuff and not accidentally ingested. Construction of the sachets and the cumbersome nature of their introduction into the package result in increased costs.

One way to overcome the disadvantages of sachets is to incorporate the scavenger directly into the wall of the food package. This can be done by placing the scavenger throughout the scavenger wall or placing the scavenger in a unique layer between many layers of the container sidewall. It should be appreciated that references to the sidewall and wall include the lid and bottom sides of the container. At present the incorporation of the scavenger throughout the container wall is found in non-transparent trays or packaging films where the scavenger is not visible. Virtually any scavenger can be used in this application because the scavenger is not visible. However, containers requiring clarity have heretofore been limited to organic type scavengers that maintain their clarity when placed in a separate layer in the wall of the container. The use of the organic scavenger in a mono-layer or single-layer construction is limited by cost and regulatory constraints due to the nature of the organic scavenger or the by-products of the scavenging reaction.

Contributing to the cost is the logistical problems encountered with the use of organic type scavengers. In most embodiments, a transition metal catalyst is used to activate an oxidizable polymer. A disadvantage of this technique is that the polymer begins reacting with oxygen as soon as the package is made. Consequently, the bottles must be filled immediately. Higher amounts of scavenger are used to compensate for the scavenging capacity lost between the time the bottle is made and when the bottle is filled.

In another technique, UV radiation is used to activate the oxidizable polymer. However, UV activation techniques are relatively expensive, and the initiators are often not regulated for use in food packaging. Packages designed for beers and juices are specifically designed to prevent UV penetration, hence UV activation would not be practical for these containers which block UV.

An alternative to a visually acceptable organic material is to use discrete scavenging particles in the container sidewall, such as reduced metal powders. Reduced iron powder is commonly used for oxygen scavenging in food packages. Iron reacts with the oxygen and forms iron oxide. Most applications also utilize a salt and a moisture absorber as reaction-enhancing agents to increase the effectiveness of the iron powder. Because the reaction usually requires water, the iron scavenging composition remains inactive until the package is filled and the reaction is activated by the water of the packaged contents which migrates into the polymer and contacts the scavenging composition.

The use of scavenging powders in clear packages has previously been limited by aesthetics, particularly haze and color. High loadings of iron powder, on the order of 500-5000 parts per million, are typically required to obtain sufficient oxygen absorption. Conventional wisdom and prior art teaches the practitioner to use the highest amount of scavenging surface area possible so that the efficiency and capacity is increased and the amount of iron added is minimized. In practice, this means a large number of small particles. Unfortunately, previous attempts at preparing resin compositions comprising high levels of small particles of iron for use in clear packages have resulted in packages with poor optical properties. This is particularly true when the resin composition is stretched or oriented to any degree in forming the final article, such as in polyester bottles. Typically, bottles prepared from such resin compositions are translucent. Haze values for these bottles are generally high, and clarity is lacking.

Thus, there remains a need for packaging materials having acceptable visual aspects and comprising activatable oxygen scavenging resin compositions.

BRIEF SUMMARY OF THE INVENTION

In general the present invention provides a container comprising an effective amount of oxygen-scavenging particles and having low haze. More specifically, the present invention includes a container having at least one wall, wherein the wall comprises a populated area, and wherein the populated area comprises a film-forming polymer; and a population of particles comprising an effective amount of oxygen-scavenging particles, wherein the number of particles of said population does not exceed a concentration of about $$(6 \times 10^7 \text{ particles} \div T) \text{ per cubic centimeter of polymer}$$

wherein T is the thickness of the populated area in mils; and wherein the wall has a transmission Hunter haze of up to about 1 percent per mil of the container wall.

The iron or other oxygen scavenger is present in an amount sufficient to effectively scavenge oxygen and provide longer shelf life for oxygen-sensitive materials. The particle size of the particle population is optimized to provide effective scavenging activity, while reducing haze.

DETAILED DESCRIPTION OF THE INVENTION

The present invention is directed to a container and a container wall. The wall includes a populated area comprising a film-forming polymer. Suitable thermoplastic polymers for use in the present invention include any thermoplastic homopolymer or copolymer. Examples of thermoplastic polymers include polyamides, such as nylon 6, nylon 66 and nylon 612, linear polyesters, such as polyethylene terephthalate, polybutylene terephthalate, polytrimethylene terephthalate, and polyethylene naphthalate, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane). Preferably, the thermoplastic polymer used in the present invention comprises a polyester polymer or copolymer.

It will be understood that a film-forming polymer is one that is capable of being made into a film or sheet. The present invention is not, however, limited to films and sheets. The container of the present invention also includes bottle walls, trays, container bases, or lids. The walls of containers such as blown bottles and thermoformed trays can be considered films or sheets that have been formed into the shape of the container, and are therefore also within the scope of the invention. Bases and lids of containers are also considered walls of a container.

Polymers employed in the present invention can be prepared by conventional polymerization procedures well known in the art. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers.

Suitable dicarboxylic acids include those comprising from about 6 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used.

One preferred polyester is polyethylene terephthalate (PET) formed from the approximate 1:1 stoichiometric reaction of terephthalic acid, or its ester, with ethylene glycol. Another preferred polyester is polyethylene naphthalate (PEN) formed from the approximate 1:1 to 1:1.6 stoichiometric reaction of naphthalene dicarboxylic acid, or its ester, with ethylene glycol. Yet another preferred polyester is polybutylene terephthalate (PBT). Copolymers of PET, copolymers of PEN, and copolymers of PBT are also preferred. Specific co and terpolymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Another preferred polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis (acetyl-acetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polymer of this invention may also contain small amounts of phosphorous compounds, such as phosphates, and a catalyst such as a cobalt compound, that tends to impart a blue hue.

The melt phase polymerization described above may be followed by a crystallization step, then a solid phase polymerization (SSP) step to achieve the intrinsic viscosity necessary for bottle manufacture. The crystallization and polymerization can be performed in a tumbler dryer reaction in a batch-type system. Alternatively, the crystallization and polymerization can be accomplished in a continuous solid state process whereby the polymer flows from one vessel to another after its predetermined treatment in each vessel.

The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the intrinsic viscosity to the desired level, which will depend upon the application. For a typical bottle application, the preferred intrinsic viscosity is from about 0.65 to about 1.0 deciliter/gram, as determined by ASTM D-4603-86 at 30° C. in a 60/40 by weight mixture of phenol and tetrachloroethane. The time required to reach this viscosity may range from about 8 to about 21 hours.

In one embodiment of the invention, the film-forming polymer of the present invention may comprise recycled polyester or materials derived from recycled polyester, such as polyester monomers, catalysts, and oligomers.

At least one wall of the container of the present invention comprises a populated area. There are technologies that can localize a population of particles into one area of a container wall. For example, where the contact surface of the film or wall is the surface adjacent to the packaged material, the oxygen scavenger could advantageously be localized in an area at the contact surface. Examples of these technologies include, but are not limited to, lamination, coextrusion, coinjection, and the like. Examples of technologies capable of localizing the population are further discussed U.S. Pat. Nos. 5,153,038, 6,413,600, 4,525,134, 4,439,493 and 4,436,778 which are hereby incorporated by reference in their entirety. It has now been discovered that high levels of particles can be incorporated into films or walls made by using these technologies. The localized area in which the population of particles is substantially located is referred to herein as the populated area.

The populated area comprises a population of particles. The thickness of the populated area is measured cross-sectionally through the container wall measuring from the contents side of the package wall to the outer edge of the wall and starts at the first particle of the population and ends when 95% of the population has been accounted for. The thickness of the populated area in a monolayer film or container is the thickness of film or container wall. In a container wall that is not a monolayer, the thickness of the populated area will be somewhat less than the thickness of the wall. The thickness of the populated area of a laminated wall is the thickness of the layer of the wall containing at least 95 percent of the population of particles. In multilayer films or walls wherein the layers blend at the interface, such as those formed by coextrusion, the thickness of the populated area is the cross-sectional thickness of layer containing at least about 95 percent of the population of particles.

In the case of two or more distinct populated areas, the thickness of the populated area is reduced by the thickness of the unpopulated area or unpopulated areas lying between the inner and outermost populated areas. This would be the case of an A–B–A structure where A contained the population. The thickness of the populated area is the thickness of A+B+A-B. in the case of A–B–A–B, the thickness is still A+B+A-B. Using the same principles, B–A–B–A–B has a thickness of A+B+A-B. A–B–A–B–A ha a population thickness of 3×A–2×B.

Preferably, the number of particles in the populated area does not exceed a concentration of about $(6 \times 10^7 \text{ particles} \div T)$ per cubic centimeter of polymer, wherein T is the thickness of the populated area in mils. More preferably, the number of particles in the populated area does not exceed a concentration of about $(3 \times 10^7 \text{ particles} \div T)$ per cubic centimeter of polymer, wherein T is the thickness of the populated area in mils. Even more preferably, the number of particles in the populated area does not exceed a concentration of about $(1.5 \times 10^7 \text{ particles} \div T)$ per cubic centimeter of polymer, wherein T is the thickness of the populated area in mils.

The population of particles comprises oxygen-scavenging particles, as well as any other components of the container, such as those discussed herein, that are present in the form of discrete particles.

Suitable oxygen-scavenging particles comprise at least one material capable of reacting with molecular oxygen. Desirably, materials are selected that do not react with oxygen so quickly that handling of the materials is impracticable. Therefore, stable oxygen-scavenging materials that do not readily explode or burn upon contact with molecular oxygen are preferred. From a standpoint of food safety, materials of low toxicity are preferred, however with proper precautions, this is not a limitation. The particles should not adversely affect the organoleptic properties of the final product. Preferably, the oxygen-scavenging particles comprise an oxygen-scavenging element selected from calcium, magnesium, scandium, titanium, vanadium, chromium, manganese, iron, cobalt, nickel, copper, zinc, silver, tin, aluminum, antimony, germanium, silicon, lead, cadmium, rhodium, and combinations thereof. More preferably, the oxygen-scavenging particles comprise an oxygen-scavenging element selected from calcium, magnesium, titanium, vanadium, manganese, iron, cobalt, nickel, copper, zinc, or tin. Even more preferably, the oxygen-scavenging particles comprise iron. It will be understood that these oxygen-scavenging elements may be present as mixtures, in compounds such as oxides and salts, or otherwise combined with other elements, with the proviso that the oxygen-scavenging elements are capable of reacting with molecular oxygen. Metal alloys comprising at least one oxygen-scavenging element are also suitable. The oxygen-scavenging particles may contain impurities that do not affect the practice of the present invention.

It is known in the art that certain substances enhance the oxygen scavenging reaction. In a preferred embodiment of the present invention, the oxygen-scavenging particles are pre-treated with one or more reaction-enhancing agents that facilitate the oxygen scavenging reaction. Any of the reaction-enhancing agents known in the art may be used.

In one embodiment of the present invention, the oxygen-scavenging particles comprise iron. The iron reacts with oxygen in its function as an oxygen scavenger. Metallic iron, or alloys or mixtures containing metallic iron may be used. Furthermore, it is to be understood that the metallic iron may contain impurities that do not affect the practice of the present invention.

At least three types of metallic iron powders are available: electrolytic, sponge, and carbonyl iron. Electrolytic iron is made via the electrolysis of iron oxide, and is available in annealed and unannealed form from, for example, OM Group, Inc. Sponge iron is available from, for example, North American Höganäs, Inc. There are at least two types of sponge iron: hydrogen-reduced sponge iron carbon monoxide-reduced sponge iron. Carbonyl iron powder is available from, for example, Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2/kg$), while hydrogen-reduced sponge iron typically has a surface area of about 200 $m^2/kg$. Sponge iron may contain small amounts of other elements, for example, carbon, sulfur, phosphorus, silicon, magnesium, aluminum, titanium, vanadium, manganese, calcium, zinc, nickel, cobalt, chromium, and copper.

The oxygen-scavenging particles are present in an effective amount for adequate oxygen-scavenging ability. If too few oxygen-scavenging particles are present, too much oxygen may be able to pass through the container wall without being scavenged. The amount required for adequate oxygen-scavenging ability depends on such factors as the application, the type of polymer used, the amount of gas barrier protection desired, the type of oxygen-scavenging particles, the particle size of the oxygen-scavenging particles, and moisture content of the packaged material. Preferably, the oxygen-scavenging container of the present invention comprises at least about 50 parts oxygen-scavenging particles per million parts by weight resin. More preferably, the container of the present invention comprises at least about 100 parts oxygen-scavenging particles per million parts by weight resin. Even more preferably, the container of the present invention comprises at least about 500 parts oxygen-scavenging particles per million parts by weight resin. Yet even more preferably, the container of the present invention comprises at least about 1000 parts oxygen-scavenging particles per million parts by weight resin.

It has been found that containers such as film or bottle articles comprising up to about 12,000 parts oxygen-scavenging particles per million parts by weight resin (1.2 weight percent) can have acceptable haze characteristics. For applications where haze is not an issue of concern, it will be appreciated that the amount of oxygen-scavenging or other particles may be much higher. Further characterization of the population of particles that is necessary for practice of the present invention is provided hereinbelow.

The composition of the present invention may optionally further comprise one or more reaction-enhancing agents known in the art to facilitate the oxygen-scavenging reaction. Examples of known reaction-enhancing agents are discussed in U.S. Pat. Nos. 5,744,056 and 5,885,481, hereby incorporated by reference in their entirety. Suitable agents are variously described as hydroscopic materials, electrolytic acidifying agents, non-electrolytic acidifying agents, metal halides, metal sulfates, metal bisulfates, and salts. The reaction-enhancing agents may be added to the polymer melt, or during extrusion.

The composition of the present invention may optionally yet further comprise one or more components selected from the group consisting of impact modifiers, surface lubricants, denesting agents, stabilizers, crystallization aids, antioxidants, ultraviolet light absorbing agents, catalyst deactivators, colorants, nucleating agents, acetaldehyde reducing agents, reheat reducing agents, fillers, branching agents, blowing agents, accelerants, and the like.

It will be understood that if the above-mentioned optional components maintain their discrete nature within the resin, then they are part of the population of particles as defined herein.

High levels of particles can be incorporated into a polyester resin composition with low haze. The particles may be admixed with the thermoplastic polymer during or after polymerization, with the polymer melt or with the molding powder or pellets from which the injection molded articles are formed, or from which the film or sheet is cast. Accordingly, the particles may be added during any of the process steps, such as during melt phase polymerization, after the melt phase polymerization (post polymerization) but before pelletization, during solid state polymerization, and during extrusion. Alternatively, a masterbatch of oxygen-scavenging resin may be prepared, and then mixed or blended with additional resin. Preferably, the masterbatch contains a relatively high amount of particles, and the desired particle concentration in the product polymer is achieved by mixing or blending the masterbatch with an amount of additional resin.

The container of the present invention advantageously possesses both effective oxygen-scavenging functionality and acceptable optical properties. The optical properties of polymers are related to both the degree of crystallinity and the actual polymer structure. Transparency is defined as the state permitting perception of objects through a sample. Transmission is the light transmitted. Transparency is measured as the amount of undeviated light. In other words, transparency is the original intensity of the incident radiation minus all light absorbed, scattered, or lost through any other means.

Many polymers are transparent, but polymers that are transparent to visible light may become opaque as the result of the presence of additives such as fillers, stabilizers, flame retardants, moisture, and gases. The opacity results from light-scattering processes occurring within the material. The light scattering reduces the contrast between light, dark, and other colored parts of objects viewed through the material and produces a milkiness or haze in the transmitted image. Haze is a measure of the amount of light deviating from the direction of transmittancy of the light by at least 2.5 degrees.

The color and brightness of a polyester article can be observed visually, and can also be quantitatively determined by a HunterLab ColorQuest Spectrometer. This instrument uses the 1976 CIE a*, b*, and L* designations of color and brightness. An a* coordinate defines a color axis wherein plus values are toward the red end of the color spectrum and minus values are toward the green end. The b* coordinate defines a second color axis, wherein plus values are toward the yellow end of the spectrum and minus values are toward the blue end. Higher L* values indicate enhanced brightness of the material.

Generally, the acceptable haziness of an article, such as a bottle or film, is determined visually. However, a HunterLab ColorQuest Spectrometer can quantitatively indicate the haze of an article or resin. This quantitative measurement is referred to herein as transmission Hunter haze.

It is known in the art that a stretched film will often have more haze than its unstretched counterpart. Therefore, haze measurements were obtained on stretched and unstretched container walls and through the bottle itself.

The container wall of the present invention may comprise unstretched films or sheets. The manufacture of films and sheets is known in the art, and any one of a number of suitable techniques can be used to prepare the film.

The container of the present invention may also comprise bottles expanded from preforms. A preform is a formed structure that is expanded in a mold to form a bottle. Alternately, the container may comprise film, pouches, or other packaging material.

In general, polyester bottles are prepared in blow-molding processes carried out by heating the preform above the polyester glass transition temperature, placing the heated preform into a mold of the desired bottle form, injecting air into the preform to force the preform into the shape of the mold, and ejecting the molded bottle from the mold onto a conveyor belt.

Two factors that must be taken into account when accurately measuring haze of stretched material and comparing haze values are the thickness of the article being measured, and the blow window.

In order to establish the proper temperature and processing time to obtain the lowest haze value due only to the crystallization process of the polyester resin, a blow window graph is constructed. The blow window graph shows haze as a function of the heat exposure time of the preform. The graph is usually constructed by creating isotherms and heating each preform at the same temperature for different lengths of time. The heated preform is then stretched and the haze measurement is performed on the stretched portion. Several different temperatures are chosen. Generally, a resin will have a best temperature that produces the lowest haze value, and that temperature is used to conduct the remaining evaluations. In the work described herein, one temperature was chosen and the parameter of time was varied to determine the optimum blow window.

While polyester has excellent optical properties, even when crystallized through strain hardening (stretching), particulate additives can reduce the transparency and increase the haze. The number of particles and the size of the particles affect the haze of both stretched and unstretched films and articles. It will be appreciated by those skilled in the art that the thermoplastic resins disclosed herein vary significantly in density. Additionally, particles of the population may vary in density. Therefore, the preferred concentration of the population of particles and scavenging particles within the resin is expressed as the number of particles per volume of the resin.

It will be understood that, within any particle population, the particles are not all the same size, but comprise a range of particle sizes. Furthermore, the particles within the population may or may not have a uniform, regular shape. The particle population, or any portion of the population, may be described by an average particle size, as measured by any of the standard techniques known in the art. These techniques include measuring the equilibrium velocities of particles settling through a liquid under the influence of gravity, resistance pulse counters, light blockage counters, image analyzers, laser diffraction spectroscopy, and photon correlation spectroscopy. Statistical values commonly used to describe the particle size of a particle population include: (1) geometric mean size, which is the average particle size calculated on a log basis; (2) arithmetic mean, which is the average particle size calculated on a linear basis; (3) median size, which is the $50^{th}$ percentile of the distribution; and (4) mode size, which is the most prevalent particle size of the distribution. Further, the sample may be described by a particle size range, or as less than or equal to a given particle size. These designations may be determined by sieving techniques, or other techniques known in the art. Thus, any given population of particles will have a particle size distribution, which is a description of the range of particle sizes and the amounts of particles of each size. Techniques for particle size determination are further discussed by Paul Webb and Clyde Orr in *Analytical Methods in Fine Particle Technology*, Micromeritics Instrument Corp. (1997), and by James P. M. Syvitski in *Principles, Methods, and Applications of Particle Size Analysis*, Cambridge University Press (1991), both of which are hereby incorporated by reference in their entireties.

Various parameters have been found to be desirable for the size of particles within the particle population. For example, it will be appreciated that particles larger than the thickness of the container wall may produce a rough surface, so that significant amounts of such large particles are to be avoided. In general, it is preferred that the size of the particles fall within the range of from about 1 to about 70 microns, more preferably from about 10 to about 70 microns, and even more preferably from about 15 to about 70 microns. Even yet more preferably, that the size of the particles fall within the range of from about 20 to about 70 microns. It will be understood that these preferred ranges are given as general guidelines only, and that a small number of particles may fall outside these ranges without affecting the essential characteristics of the resin, and are therefore within the scope of the present invention.

Recitations throughout the specification and claims of "do not exceed about $6.0 \times 10^7$" are intended to include smaller amounts of particles, depending upon the amount that is preferred. Desirably, large amounts of particles are added to the resin and the impact on haze is minimized. This can be accomplished by selecting the particle size distribution of the population of particles, and controlling the total number of particles to keep it below a certain maximum value per unit volume of polymer. This maximum value is related to thickness of the populated resin.

High levels of particles can be incorporated into a container wall with low haze by a method comprising the steps of: providing a population of particles; selecting the particle size distribution of the population to comprise an appropriate number of particles within the preferred size range; adding the population of particles to a polymer to form a mixture of polymer and particles during one or more of the process steps of: melt phase polymerization of the polymer; post polymerization and prior to pelletization; solid state polymerization of the polymer; and extrusion; and forming a container having at least one wall by using the mixture of polymer and particles.

As discussed above, the population of particles may be localized into one or more populated areas of a container wall, by various technologies. In this embodiment, the populated area comprises the mixture of polymer and particles, and the method further comprises the step of combining the mixture with additional polymer to form a wall having a populated area and at least one other area. The additional polymer may be a different polymer or the same polymer but without any scavenger present.

The container, according to the present invention, can comprise unstretched films or sheet of any thickness typically employed in the art of polymer films.

In a preferred embodiment, the film has a thickness of at least about 0.5 mils, and a transmission Hunter haze number of, preferably, less than about 10 percent, more preferably less than about 8 percent, and even more preferably less than about 5 percent. While higher than the haze numbers for polyester samples comprising no oxygen-scavenging or other particles, these haze values are well within the range of values acceptable for many commercial applications.

The container can comprise bottles wherein each bottle sidewall has a thickness of from about 9 to about 35 mils, preferably from about 11 to about 25 mils, and more preferably from about 14 to about 21 mils.

In a preferred embodiment, each bottle sidewall has a thickness of from about 14 to about 21 mils, and the bottle has a Hunter haze number of, preferably, less than about 10 percent, more preferably less than about 8 percent, and even more preferably less than about 5 percent, at optimum blow window conditions. While higher than the haze numbers for polyester samples comprising no iron or other particles of oxygen-scavenging composition, these haze values are well within the range of values acceptable for many commercial applications.

The maximum preferred concentrations of particles recited above were determined for unstretched films having a crystallinity of less than about one percent. In general, as the crystallinity of the polymer resin increases, haze increases. It will therefore be understood that the maximum preferred concentration of particles will be lower in polymer compositions having higher crystallinity In order to demonstrate the practice of the present invention, the following examples have been prepared and tested as described in the General Experimentation Section disclosed herein below. The examples should not, however, be viewed as limiting the scope of the invention. The claims will serve to define the invention.

GENERAL EXPERIMENTATION

Preparation of Examples Nos. 1-26

A PET copolymer resin was prepared by the teachings of U.S. Pat. No. 5,612,423 that is incorporated herein by reference. Samples of iron particles having various particle sizes were obtained. Hydrogen-reduced spong iron from Pyron was used for examples 1-10. Carbonyl iron powder obtained from ISP Technologies was used for examples 11-26. Thus, the iron particles used in Example No. 3 had a particle size range of about 25 to about 38 microns. It will be understood that such a sample can be prepared, for example, by using sieves. The iron particles were added to polyester resin, by using a metered feeder on a twin-screw extruder, to form a masterbatch of resin containing 2.5 percent by weight iron-containing resin composition. This masterbatch was blended with the base resin to obtain the desired concentration. The base resin/iron mixtures were dried under vacuum at 325° F. (163° C.) for 18 hours. The dried resins were transferred to is a Novotec drying hopper of a Nissei ASB 50T Injection Blow-Molding machine. The hopper was heated to 325° F. (163° C.) and set for a dew point of −40° F. (−40° C.).

The bottle preforms were manufactured and blown into bottles in a two-step process. First, the preforms were prepared on a Mini-jector or Nissei machine. Then, the bottles were blown from their preforms on a Cincinnati Milacron Reheat Blow Lab (RHB-L) blow molding machine. The preforms were prepared on the Mini-jector using a cycle time of 45 second, inject time of 15 seconds, with a rear heater temperature of 270° C., a front heater temperature of 275° C., and a nozzle heat of 275° C. The inject pressure was between about 1000 and about 1500 psig. The oven temperature on the Milacron RHB-L was from about 163 to about 177° C. The exposure time was from about 31 to about 52 seconds.

The haze measurements were taken through the bottle sidewall, which is the thinned, stretched portion. Because these measurements were taken on the whole bottle, the thickness actually contains two sidewalls. A HunterLab ColorQUEST Sphere Spectrophotometer System equipped with an IBM PS/2 Model 50Z computer, IBM Proprinter II dot matrix printer, assorted specimen holders, and green, gray and white calibration tiles, and light trap was used. The HunterLab Spectrocolorimeter integrating sphere sensor is a color and appearance measurement instrument. Light from the lamp is diffused by the integrating sphere and passed either through (transmitted) or reflected (reflectance) off an object to a lens. The lens collects the light and directs it to a diffraction grating that disperses it into its component wave lengths. The dispersed light is reflected onto a silicon diode array. Signals from the diodes pass through an amplifier to a converter and are manipulated to produce the data. Haze data is provided by the software. It is the calculated ratio of the diffuse light transmittance to the total light transmittance multiplied by 100 to yield a "Haze %" (0% being a transparent material, and 100% being an opaque material). Samples prepared for either transmittance or reflectance must be clean and free of any surface scratches or abrasions. The size of the sample must be consistent with the geometry of the sphere opening and in the case of transmittance, the sample size is limited by the compartment dimension. Each sample is tested in four different places, for example on the bottle sidewall or representative film area.

A Panametrics Magna-Mike 8000 Hall Effect Thickness Gauge was employed to measure the bottle sidewall thickness. A small steel ball is placed on one side of the test material and a magnetic probe underneath. The distance between the ball and the probe is measured by means of the Hall effect sensor. More specifically, a Magna-Mike 8000 equipped with a DPU-411 thermal printer (type II), a remote foot switch, a target ball kit, and a Standard 801PR Probe was used. Two measurements were taken and averaged.

The iron particle concentration, average iron particle size, and the haze values at a constant sample thickness of from about 11 to about 13 mils and optimum blow window conditions are summarized in Tables 1 and 2. Comparative Example Nos. 1, 6, and 11 contained no iron particles. The particle size of the iron particles reported in Table 1 was provided by the supplier. The particle size of the iron particles in Table 2 were determined as the geometric mean based upon volume.

TABLE 1

Iron Particles in Stretched Polyester Film Compositions

| Example No. | Fe conc. (ppm) | Particle size (microns) | Optimum reheat time (sec) | Haze (%) |
|---|---|---|---|---|
| 1 | 0 | — | 43 | 1.5 |
| 2 | 1250 | ≦25 | 49 | 7.56 |
| 3 | 1250 | 25-38 | 49 | 4.53 |
| 4 | 1250 | 38-45 | 52 | 4.58 |
| 5 | 1250 | 45-75 | 52 | 4.41 |
| 6 | 0 | — | 43 | 1.5 |
| 7 | 2500 | ≦25 | 46 | 14.08 |
| 8 | 2500 | 25-38 | 46 | 9.13 |
| 9 | 2500 | 38-45 | 46 | 8.45 |
| 10 | 2500 | 45-75 | 40 | 8.56 |

TABLE 2

Iron Particles in Stretched Polyester Film Compositions and Haze Values

| Example No. | Fe conc. (ppm) | Particle size (microns) | No. of particles per cm$^3$ polymer (×10$^6$) | Optimum reheat time (sec) | Haze (%) | L* |
|---|---|---|---|---|---|---|
| 11 | 0 | — | 0 | 43 | 1.5 | 90.89 |
| 12 | 100 | 3.23 | 0.3729 | 46 | 5.1 | 89.78 |
| 13 | 250 | 3.23 | 0.9324 | 40 | 6.98 | 88.66 |
| 14 | 500 | 3.23 | 1.8647 | 46 | 9.12 | 86.17 |
| 15 | 800 | 3.23 | 2.9836 | 46 | 11.63 | 83.99 |
| 16 | 1000 | 3.23 | 3.7295 | 46 | 16.44 | 78.1 |
| 17 | 100 | 4.787 | 0.0750 | 49 | 4.55 | 89.76 |
| 18 | 250 | 4.787 | 0.1875 | 49 | 6.74 | 89.73 |
| 19 | 500 | 4.787 | 0.3750 | 46 | 9.04 | 88.27 |
| 20 | 800 | 4.787 | 0.5999 | 46 | 11.8 | 87.21 |

TABLE 2-continued

Iron Particles in Stretched Polyester Film Compositions and Haze Values

| Example No. | Fe conc. (ppm) | Particle size (microns) | No. of particles per cm³ polymer (×10⁶) | Optimum reheat time (sec) | Haze (%) | L* |
|---|---|---|---|---|---|---|
| 21 | 1000 | 4.787 | 0.7499 | 46 | 12.99 | 83.68 |
| 22 | 100 | 7.819 | 0.0483 | 49 | 5.4 | 90.51 |
| 23 | 250 | 7.819 | 0.1207 | 46 | 6.85 | 89.83 |
| 24 | 500 | 7.819 | 0.2415 | 43 | 8.49 | 88.79 |
| 25 | 800 | 7.819 | 0.3864 | 49 | 7.83 | 88.06 |
| 26 | 1000 | 7.819 | 0.4830 | 46 | 8.81 | 87.27 |

Preparation of Examples Nos. 27-32

Examples 27 through 32 are also stretched film samples prepared as above. Results are shown in Table 3. The type of iron used for Examples 27-29 was unannealed electrolytic iron having a geometric mean particle size based upon volume of about 10.84 microns. The iron used for Examples 30-32 was carbon monoxide-reduced sponge iron having a geometric mean particle size based upon volume of about 18.61 microns. While the parts iron by weight per million parts by weight polymer are comparable, the number of particles per cubic centimeter polymer increase with decreasing particle size, and the transmission Hunter haze per mil thickness of the film also increases. It should be noted that for examples 27-32, the haze measurement was taken on the bottle sidewall only and was not taken through the complete bottle.

TABLE 3

Variation of Particle Size, Number of Particles, and Haze

| Example No. | PPM Iron (by weight) | No. of Particles per cc³ Polymer (×10⁶) | Thickness (mils) | Haze per mil (%) |
|---|---|---|---|---|
| 27 | 1000 | 0.2183 | 13.0 | 0.257 |
| 28 | 2000 | 0.4365 | 11.0 | 0.532 |
| 29 | 3000 | 0.6548 | 13.0 | 0.630 |
| 30 | 1000 | 0.0296 | 11.0 | 0.094 |
| 31 | 2000 | 0.0593 | 11.0 | 0.155 |
| 32 | 3000 | 0.0889 | 11.0 | 0.254 |

Preparation of Examples Nos. 33-44

In order to investigate the optimum concentration of particles of various sizes in unstretched resin, films were made by using a Haake mixer. 2500.0 grams of HiPERTUF 89010 copolyester resin was weighed into each of several 1-gallon cans and dried in a vacuum oven under full vacuum at about 100° C. overnight. The vacuum was restored to atmospheric pressure with nitrogen. Appropriate amounts of carbonyl-type iron powder, manufactured by ISP Technologies was weighed under nitrogen into vials for the different concentrations desired. The nominal particle size range of the iron provided by the supplier was about 7 to about 9 microns. The geometric mean particle size based on volume for this iron powder was about 7.819 microns. The iron was added to the resin just prior to removing the hot resin from the oven, the vials were sealed, and the mixture was blended on a roller mill for about 5 minutes.

The blended mixture was added to the feed hopper of a Haake Polylab extrusion system for film production. The resin was melted in the extruder and forced out of the die in the form of a flat sheet. The thin, unoriented, substantially amorphous film was fed through a 3-roll temperature-controlled polishing stack, quenched to minimize crystallinity and to give a final, polished surface. The cooled film was wound onto a core. The thickness of the films measured in mils, the percent transmission Hunter haze, and the percent haze per mil for typical film samples having a constant concentration of iron are shown in Table 4. The concentration of iron is about $0.9659 \times 10^6$ particles per cubic centimeter polymer for Examples 33 and 34, and about $2.8978 \times 10^6$ particles per cubic centimeter polymer for Examples 35-37. It can be seen that, while haze increases with increasing film thickness, the haze per mil of film thickness stays constant.

In Examples 38-44, the thickness of the films was kept constant at about 11 mils, number of particles per cubic centimeter of polymer was varied. It can be seen that the haze per mil thickness increases with increasing particle concentration.

TABLE 4

Dependency of Haze on Thickness of Populated Area (T)

| Example No. | Fe Conc (ppm) | Thickness T (mils) | Haze (%) | Haze/mil |
|---|---|---|---|---|
| 33 | 2000 | 11 | 2.17 | 0.197 |
| 34 | 2000 | 15 | 3.07 | 0.205 |
| 35 | 6000 | 11 | 5.29 | 0.481 |
| 36 | 6000 | 15.3 | 6.68 | 0.437 |
| 37 | 6000 | 20 | 8.78 | 0.439 |

TABLE 5

Dependency of Haze on Number of Particles

| Example No. | Fe Conc (ppm) | No. of Particles per cm³ of Polymer (×10⁶) | Thickness T (mils) | Haze/mil |
|---|---|---|---|---|
| 38 | 0 | 0 | 10 | 0.035 |
| 39 | 1000 | 0.483 | 11 | 0.127 |
| 40 | 2000 | 0.9659 | 11 | 0.197 |
| 41 | 3000 | 1.4489 | 11 | 0.302 |
| 42 | 6000 | 2.8978 | 11 | 0.481 |
| 43 | 10000 | 4.8297 | 11 | 0.745 |
| 44 | 12000 | 5.7956 | 10.7 | 0.880 |

Haze values of less than 10% are obtained, even at iron levels of 2500 ppm, when the iron particle size is greater than about 25 microns, as shown in Table 1. At 1250 ppm iron, and also at 2500 ppm iron, the highest haze values were obtained when the average particle size was less than or equal to about 25 microns, i.e., Example Nos. 2 and 7, respectively. Nevertheless, when the iron particle size is less than or equal to about 25 microns, haze values of less than 10% are obtained at iron levels up to about 1250 ppm. As shown in Table 2, when the iron particle size is less than or equal to about 8 microns, haze values of less than 10% are obtained at iron levels up to about 800 ppm. Furthermore, when the iron particle size is less than or equal to about 5 microns, haze values of less than 10% are obtained at iron levels up to about 500 ppm.

When the population of particles is a constant parts by weight per million parts polymer, the number of particles per cubic centimeter of polymer decreases as the particle size increases, as shown in Table 3. The overall transmission Hunter haze increases as the thickness of the sample increases, as shown in Table 4, however the haze per mil of thickness stays relatively constant. Haze values of less than 1.0% per mi of a container wall are obtained at concentrations of particles of up to ($6 \times 10^7$ particles÷T) per cubic centimeter of polymer, wherein T is the thickness of the populated area in mils, as shown in Table 5.

As should now be understood, the present invention overcomes the problems associated with the prior art by providing a thermoplastic resin composition which contains an effective amount of oxygen-scavenging particles and which has acceptable color and haze characteristics. The resulting resin can be used to form transparent bottles, films, and other containers and packaging materials. These materials comprise oxygen-scavenging particles in an amount sufficient to effectively scavenge oxygen and provide longer shelf life for oxygen-sensitive materials. Furthermore, these materials have acceptable haze characteristics.

While the best mode and preferred embodiment of the invention have been set forth in accordance with the Patent Statutes, the scope of this invention is not limited thereto, but rather is defined by the attached claims. Thus, the scope of the invention includes all modifications and variations that may fall within the scope of the claims.

What is claimed is:

1. A container having at least one wall, wherein the wall comprises a populated area, and wherein the populated area comprises:
    a film-forming polymer selected from the group consisting of polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, and copolymers of polytrimethylene terephthalate; and
    a population of particles comprising an effective amount of oxygen-scavenging particles, wherein the number of particles of said population does not exceed a concentration of about ($6 \times 10^7$ particles÷T) per cubic centimeter of polymer wherein T is the thickness of the populated area in mils;
    wherein the oxygen scavenging particles comprise an element selected from the group consisting of calcium, magnesium, scandium, titanium, vanadium, chromium, manganese, iron, cobalt, nickel, copper, zinc, silver, tin, aluminum, germanium, silicon, lead, cadmium, and rhodium;
    wherein said wall has a transmission Hunter haze of up to about 1 percent per mil of the container wall; and
    said wall is of a monolayer construction.

2. The container of claim 1, wherein the film-forming polymer is selected from the group consisting of copolymers of polyethylene terephthalate, copolymers of polyethylene naphthalate, copolymers of polybutylene terephthalate, and copolymers of polytrimethylene terephthalate and the film forming polymer is prepared from one or more polyfunctional comonomers.

3. The container of claim 2, wherein said polyfunctional comonomers are selected from the group consisting of pyromellitic dianhydride and pentaerythritol.

4. The container of claim 1, wherein said oxygen-scavenging particles comprise iron.

5. The container of claim 2, wherein said oxygen-scavenging particles comprise iron.

6. The container of claim 3, wherein said oxygen-scavenging particles comprise iron.

7. The container of claim 1, wherein said oxygen-scavenging particles comprise iron, and wherein said oxygen-scavenging particles are present in an amount of from about 50 to about 12,000 parts per million by weight of the resin.

8. The container of claim 1, wherein said population of particles further comprises reaction-enhancing particles.

9. The container of claim 8, wherein said reaction-enhancing particles comprise hydroscopic materials, electrolytic acidifying agents, non-electrolytic acidifying agents, metal halides, metal sulfates, metal bisulfates, or mixtures thereof.

10. The container of claim 1, wherein said oxygen-scavenging particles are pretreated with at least one reaction-enhancing agent.

11. The container of claim 1, wherein said container is a stretched bottle having a sidewall thickness of from about 11 to about 25 mils and a Hunter haze value of about 10% or less.

12. The container of claim 4, wherein said container is a stretched bottle having a sidewall thickness of from about 11 to about 25 mils and a Hunter haze value of about 10% or less.

13. The container of claim 7, wherein said container is a stretched bottle having a sidewall thickness of from about 11 to about 25 mils and a Hunter haze value of about 10% or less.

14. The container of claim 1, wherein said container is a tray.

* * * * *